United States Patent [19]

Hammond

[11] Patent Number: 5,417,469
[45] Date of Patent: May 23, 1995

[54] MODULAR SYSTEM FOR CAMPING IN A SPORT UTILITY VEHICLE

[76] Inventor: John M. Hammond, 6172 Knickerbocker Rd., Ontario, N.Y. 14519

[21] Appl. No.: 137,635

[22] Filed: Oct. 18, 1993

[51] Int. Cl.⁶ ............................................. B60P 3/34
[52] U.S. Cl. .................................. 296/163; 296/165; 135/88.07
[58] Field of Search ................. 296/26, 159, 163–165, 296/167, 174, 176; 135/88, 89

[56] References Cited

U.S. PATENT DOCUMENTS

| | | | |
|---|---|---|---|
| 2,353,820 | 7/1944 | Eddins | 296/26 |
| 4,192,543 | 3/1980 | Crawford | 296/159 |
| 4,221,425 | 9/1980 | Welle et al. | 296/163 |
| 4,310,194 | 1/1982 | Biller | 296/26 X |
| 4,544,195 | 10/1985 | Gunn | 296/165 X |
| 4,652,040 | 3/1987 | Mahan | 296/159 |
| 5,226,689 | 7/1993 | Roe et al. | 296/159 |

FOREIGN PATENT DOCUMENTS

| | | | |
|---|---|---|---|
| 2409883 | 7/1979 | France | 296/165 |
| 605208 | 9/1978 | Switzerland | 296/26 |

*Primary Examiner*—Dean J. Kramer
*Attorney, Agent, or Firm*—Howard J. Greenwald

[57] ABSTRACT

An apparatus for attaching an enclosure to the back of a motor vehicle which contains a substantially U-shaped plate, at least two devices for attaching such plate to the motor vehicle, a cover, a device for attaching the cover to the substantially U-shaped plate, and a device for attaching the cover to the motor vehicle. When the cover is attached to both the substantially U-shaped plate and to the motor vehicle, it encloses the space between the back section of such vehicle and such cover and forms a substantially water-proof enclosure covering the space.

7 Claims, 5 Drawing Sheets

MODULAR SYSTEM FOR CAMPING IN A SPORT UTILITY VEHICLE

FIELD OF THE INVENTION

A modular system for camping in a sport utility vehicle which contains a tent-like enclosure which can be fitted over the vehicle tailgate and its associated opening at the rear of the vehicle, an awning, and screened window inserts.

BACKGROUND OF THE INVENTION

Devices which are secured to the rearward portion of motor vehicles for the purpose of recreational camping within the vehicles are well known to those skilled in the art. However, to the best of the applicant's knowledge, no such device or set of devices is available which provides adequate protection front adverse weather conditions, can be easily installed on the vehicle, requires no modifications or additions to the vehicle, and is capable of being easily stored and transported in a compact transporting container.

One prior art camping device was described in July of 1993 in U.S. Pat. No. 5,226,689 of Roe et al. In discussing the problems of conventional tent camping, Roe et al. disclosed (at column 1) that " . . . erecting the tent was usually a lengthy process, often quite complicated." Roe et al. further disclosed (at column 1) that a number of problems exist with prior art camping devices which attach to motor vehicles; among the problems are that " . . . they are not easily erected or taken apart. . . ", and " . . . they do not appear to provide adequate weather-proofing and water leakage and drainage control."

However, the apparatus proposed by Roe et al. in response to these problems is itself a complicated system, which requires a multi-component tube frame assembly, a seal to be joined to the external surface of the vehicle, provisions for sealing around the vehicle's spare tire rack, and a vertical support pole for extending the uppermost portion of the canvas enclosure into a steeple shaped configuration.

It would appear that the apparatus of the Roe et al. patent is not easily erected due to the complex nature of the tube frame which must be fitted together from sub-assemblies prior to the installation of the fabric covering to the vehicle. Furthermore, it appears that the frame assembly has a degradative effect on the vehicle tailgate paint finish on which it rests, causing mars and scratches to the finish. The durability of the frame assembly when subjected to the repeated rigors of camping also appears to present a problem.

Furthermore, it does not appear that the apparatus of the Roe et al. patent provides adequate protection from adverse weather conditions typically encountered when camping. The apparatus of this patent employs a rubber gasket sealing material attached to the canvas enclosure along its forwardmost edge which is in contact with the roof and sides of the vehicle toward the rearward portion of the vehicle. However, in practice, the surface of this particular portion of many motor vehicles intended for use of this apparatus is very often of an irregular and discontinuous nature because of such features as ribbing of the roof surface for structural strength, rain gutters at the edges of the vehicle roof, framing of the vehicle windows, fitting of the vehicle with decorative trim, moldings and accessories such as roof mounted luggage racks, and the like. The rubber gasket sealing means which is secured to the vehicle by the tension of elastic cords in the system of this patent is not likely to properly conform to these numerous surface irregularities, Additionally, it appears that, when exposed to rain, the steeple-like configuration of the apparatus of the Roe et al. patent directs a large portion of accumulated rain water into contact with the rubber gasket sealing means, causing significant leakage of rain into the vehicle, particularly in the presence of wind directed toward the rearward portion of the vehicle.

The spare tire rack seal disclosed by Roe et al. (at column 5 of their patent) is yet another feature which is likely to result in a leakage of water into the interior of the vehicle, as this seal employs " . . . a synthetic fuzzy fabric that adheres to a mating hook fabric when pressed together." The use ore these "VELCRO" fabric components is well known to those skilled in the art of camping equipment design; however, these fabric fastening components are not used in weather sealing applications because the manner in which they join to each other does not provide a seal which excludes the flow of liquids.

The Roe et al. patent is the most recent attempt of which applicant is aware to provide a satisfactory modular system for camping in a sport utility vehicle, and it is far from perfect. However, the system of Roe et al. was superior in many respects to earlier systems described in the prior art.

One such earlier system is described in 1985 in Mary Gunn's U.S. Pat. No. 4,544,195. The Gunn patent discloses a tent-like apparatus which encloses the opening at the rearward portion of a vehicle, including the vehicle tailgate mechanism. However, the device of this patent requires that the vehicle have a rear window which is hinged along the rear roof line and swings outward and upward in order to provide structural support for the tent enclosure and that Gunn's tent-like enclosure be secured to the roof and sides of the vehicle with a series of snaps. Thus, the Gunn apparatus appears to lack sufficient sealing means adequate to prevent leakage of wind and precipitation from entering the vehicle.

Yet another prior art device was disclosed by Robert Straub in 1985 in his U.S. Pat. No. 4,504,049. The device of Straub is suitable only on those vehicles which have a large hatchback that is hinged along the rearward roof line of the vehicle and swings upward to its open position. In an attempt to provide adequate reclining space to occupants of the vehicle, the Straub apparatus requires a rigid panel of material which is fitted to the rear of the vehicle along the lower line of the hatchback opening.

Furthermore, the tent-like enclosure portion of the Straub device must be contacted with the vehicle along the rearward roof and side panels of the vehicle. Thus, the Straub device suffers from tile same disadvantages as the device of the Roe et al. patent; it does a poor job of excluding rain and wind.

None of the prior art devices known to the applicant include a means for providing additional ventilation from the forward portion of the vehicle on which the device is used. Furthermore, the prior art devices do not include a means for conveniently storing and transporting all system components fitted to the vehicle for the purpose of camping.

It is therefore an object of this invention to provide a camping apparatus to be attached to a sport utility vehicle which is easy to erect and secure to the vehicle.

It is another object of this invention to provide a camping apparatus to be attached to a sport utility vehicle which provides adequate protection from inclement weather.

It is a further object of this invention to provide a camping apparatus to be attached to a sport utility vehicle which is lightweight and can be collapsed into a compact shape for easy storage and transportation, It is another object of this invention to provide a camping apparatus to be attached to a sport utility vehicle which encloses the tailgate of the vehicle, thereby providing occupants of the vehicle with adequate room to recline.

It is another object of this invention to provide a camping apparatus to be attached to a sport utility vehicle which allows easy entry into and exit from the rearward portion of the vehicle.

It is an additional object of this invention to provide a camping apparatus to be attached to a sport utility vehicle which requires no structural modifications or additions to the vehicle and which does not adversely affect the paint finish of the vehicle.

It is a further object of this invention to provide a camping apparatus to be attached to a sport utility vehicle which provides superior ventilation within the vehicle while excluding inclement weather and flying insects.

It is another object of this invention to provide a camping apparatus to be attached to a sport utility vehicle which does not require that a portion of the apparatus be enclosed or sealed around a spare tire rack.

It is another object of this invention to provide a camping apparatus to be attached to a sport utility vehicle containing an awning which provides protection from sun and rain immediately adjacent to the vehicle.

It is an additional object of this invention to provide a camping apparatus to be attached to a sport utility vehicle which includes a lightweight bag for the storage and transportation of all parts of the apparatus.

It is an object of this invention to provide a camping apparatus to be attached to a sport utility vehicle which is inexpensive to manufacture.

SUMMARY OF THE INVENTION

In accordance with this invention, there is provided an apparatus for camping in a sport utility vehicle comprised of a tent-like enclosure joined to a fixturing plate which is secured to the rearward portion of the vehicle, an awning which is joined to the tent-like enclosure and extends outwardly from the rearward area of the vehicle, and a pair of ventilation windows which are fitted to the window openings of the doors of the vehicle.

BRIEF DESCRIPTION OF THE DRAWINGS

The present invention will be more fully understood by reference to the following detailed description thereof, when read in conjunction with the attached drawings, wherein like reference numerals refer to like elements and wherein.

DESCRIPTION OF THE PREFERRED EMBODIMENTS

Figure 1:
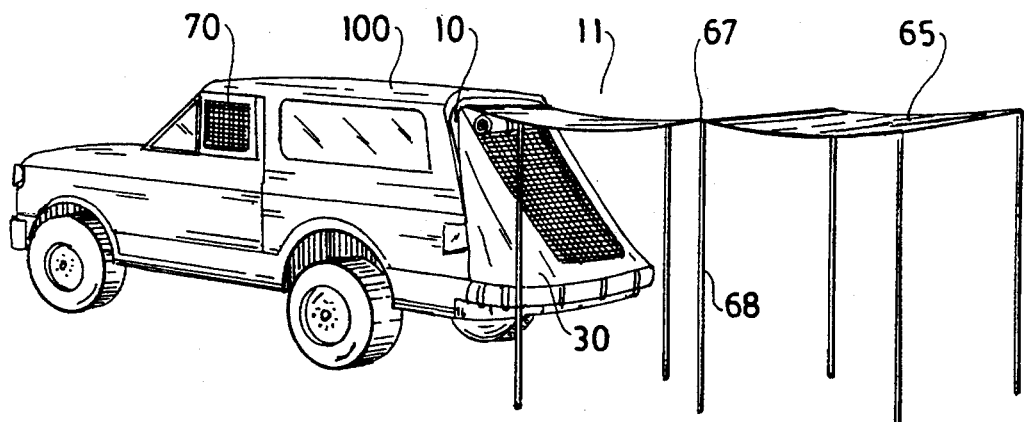
FIG. 1 is a perspective view of the preferred embodiment of the tent-like enclosure, the awning, and ventilation windows of the applicant's invention shown attached to the vehicle.

FIG. 1 is a perspective view of one preferred embodiment of the applicant's invention shown attached to the vehicle. Referring to FIG. 1, it will be seen that applicant's modular apparatus 11 is preferably comprised of a tent-like enclosure 30 joined to a fixturing plate 10 which is secured to the rearward portion of the vehicle 100. In the preferred embodiment illustrated in FIG. 1, applicant's modular apparatus 11 also is comprised of an awning 65 which is joined to the tent-like enclosure 30 and extends outwardly from the rearward area of the vehicle, and, additionally, a pair of ventilation windows 70 (shown, for the sake of simplicity, on only one side of vehicle 100) which are fitted to the window openings of the doors of the vehicle.

As will be apparent to those skilled in the art, the modular system 11 of this invention is especially suitable for use on a recreational vehicle of the type with a rear tailgate and rear sliding glass window retractable into said tailgate and hinged directly above the bumper of the vehicle to pivot from an upright closed position downward to a horizontal open position. This type of recreational vehicle is well known to those skilled in the art and is described, e.g., in U.S. Pat. No. 5,226,689 of Richard P. Roe et al., the entire disclosure of which is hereby incorporated by reference into this specification.

As is known to those skilled in the art, the "Bronco" recreational vehicle is a sport utility vehicle which is sold by the Ford Motor Company of Dearborn, Mich. and which has a rear tailgate and rear sliding glass window retractable into said tailgate and hinged directly above the bumper of the vehicle to pivot from an upright closed position downward to a horizontal open position. The "4-RUNNER" sold by the Toyota Motor Company also is a sport utility vehicle which has a rear tailgate and rear sliding glass window retractable into said tailgate and hinged directly above the bumper of the vehicle to pivot from an upright closed position downward to a horizontal open position. Up until at least as late as 1992, the "BLAZER" sold by the Chevrolet Division of the General Motors Corporation also was a sport utility vehicle which had a rear tailgate and rear sliding glass window retractable into said tailgate and hinged directly above the bumper of the vehicle to pivot from an upright closed position downward to a horizontal open position. Those skilled in the art will be aware of other vehicles with this configuration.

Figure 2:
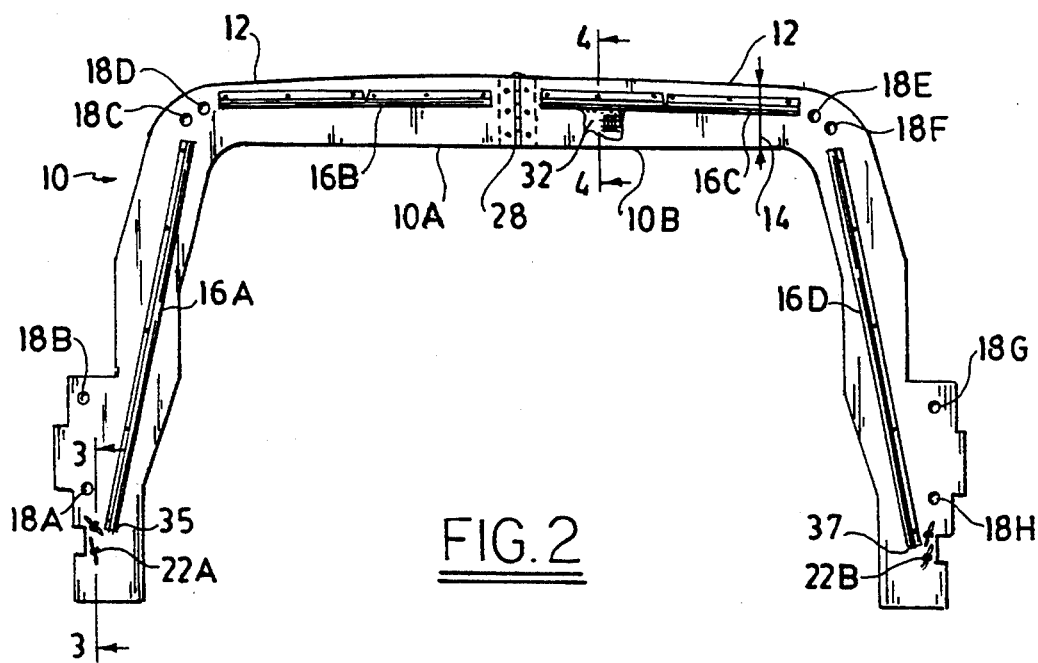
FIG. 2 is an elevation view of the fixturing plate used to secure the tent-like enclosure to the rear of the vehicle.

FIG. 2 is an elevation view of a fixturing plate 10 used to secure the tent-like enclosure 30 (see FIG. 1) to the rear of the vehicle 100 (see FIG. 1).

Referring to FIG. 2, said fixturing plate 10 preferably is a substantially U-shaped structure which, in one embodiment, preferably consists essentially of rigid, lightweight plastic such as high density polypropylene, high density polyethylene, nylon, or other suitable plastic. These plastic materials are well known to those skilled in the art and are described, e.g., in the, "Modern Plastics Encyclopedia," which is the mid-October 1991 issue of "Modern Plastics" (Volume 68, No. 11) published by Modern Plastics of P.O. Box 481, Highstown, N.J.

As is known to those skilled in the art, sheets of such plastic may be commercially purchased, cut to the desired size and shape, affixed with the required orifices, and secured to the appropriate fixtures. Thus, by way of illustration, one may purchase a sheet of high-density polypropylene which is 3.0'×6.0' by ¼" from the Cadillac Plastics and Chemical Company of 1328 University Avenue, Rochester, N.Y.

Alternatively, or additionally, fixturing plate 10 may be comprised of aluminum, plywood, composite material, and/or other rigid material, preferably in sheet form.

In one preferred embodiment, fixturing plate 10 is preferentially of a thickness which is at least as thick as the thickness of the tailgate window of the vehicle 100 (see FIG. 1). Thus, for example, when the tailgate window of vehicle 100 is 0.25 inches thick, one may, e.g., use a fixturing plate which is at least about 0.25 inches thick. In general, it is preferred that the thickness of plate 10 be from about 0.2 to about 0.4 inches.

Figure 4:
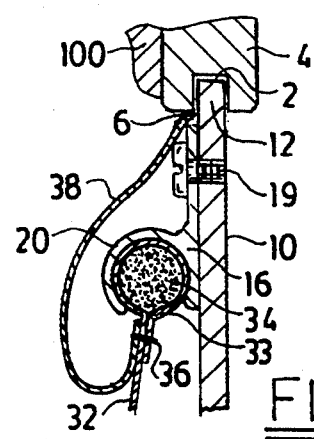
FIG. 4 is a detailed section view of awning rail means adapted to secure the tent-like enclosure to the fixturing plate of FIG. 2.

Referring again to FIG. 2, and also to FIG. 4 when the fixturing plate 10 is secured to the vehicle 100 (see FIG. 1), the upper edge 12 of said fixturing plate 10 is inserted into the gasket groove 2 of the tailgate window gasket 4 existing at the rear of the vehicle 100. Said gasket groove 2 is normally used for the purpose of providing a seal around the edge of the tailgate window when said window (not shown) is in its closed (raised) position. Thus both securing of the fixturing plate 10 and sealing of the fixturing plate 10 is achieved when said fixturing plate 10 is inserted into said gasket groove 2.

Referring again to FIG. 2, the fixturing plate 10 preferably has an upper edge 12 has a shape which is identical or substantially identical to the upper edge (not shown) of the tailgate window of the vehicle; thus, in the embodiment depicted in FIGS. 1 and 2, fixturing plate 2 is substantially thus crescent shaped.

Referring again to FIG. 2, the width 14 along any section of said crescent shape fixturing plate 10 preferably ranges from about between 2 and 4 inches. In one embodiment of the applicant's fixturing plate 10, the use of 0.25 inch thick high density polypropylene with a width 14 of 3–4 inches along said crescent shaped fixturing plate 10 was found to provide adequate structural strength, light weight, and effective sealing from adverse weather when fitted to said tailgate window gasket groove 2 of the vehicle 100.

Referring again to FIG. 2, awning rails 16A, 16B, 16C, and 16D and snaps 18A, 18B, 18C, 18D, 18E, 18F, 18G, and 18H may be affixed to fixturing plate 10 and are used as means to secure the tent-like enclosure 30 to the fixturing plate. 10. Mating snaps are provided to be joined with snaps 18A through 18H at the corresponding points of contact of the tent-like enclosure 30 to the fixturing plate 10.

Fixturing plate 10 is comprised of a multiplicity of awning rails 16A et seq. adapted to receive and secure the tent like enclosure 30. These awning rails are well known to those skilled in the art and are commonly used in camping equipment and recreational vehicle design to secure flexible fabric to a rigid surface. They are readily commercially available and may be purchased from, e.g., R. V. Corral Company of Ontario, N.Y.

The use of awning rails 16A through 16D is illustrated in detail in FIG. 4. Referring to FIG. 4, which illustrates one embodiment of applicant's invention, awning rail 16 is secured to fixturing plate 10 via screw 19. Alternatively, said awning rail 16 could be suitably secured to said fixturing plate 10 via rivets, adhesive, or other fastening means well known in the art.

The tent like enclosure 30 which is secured by the awning rail 16 may be fabricated by conventional means. Thus, in the construction of the tent-like enclosure 30 of FIG. 1, the fabric 32 shown in FIG. 4 is wrapped around a flexible cord 34 and joined unto itself via stitching 36, thereby enclosing cord 34 in a loop 33 of fabric 32.

The particular awning rail illustrated in FIG. 4 is fabricated with a solid arc shaped section 20 encompassing approximately 270 degrees of circular arc; the diameter of said arc shaped section 20 is slightly greater than the diameter of said cord.

During the securing of the tent-like enclosure 30 of FIG. 1 to the fixturing plate 10, the loop of fabric 32 enclosing the flexible cord 34 is fitted along the inside of the awning rail, thus joining the fabric to the awning rail in a manner well known in the art of camping equipment and recreational vehicle design.

Referring again to FIG, 2, the length of cord 34 of FIG. 4 enclosed in said loop of fabric 32 of FIG.4 extends from the lower extremity 35 of awning rail 16A, upward along awning rail 16A, horizontally along awning rails 16B and 16C, and downward along awning rail 16D, to lower extremity 37. The tent-like enclosure 30 is thus fastened to the fixturing plate 10 along the entire length of the awning rails 16A through 16D. The tent-like enclosure 30 may be further secured to the fixturing plate 10 via snaps 18A through 18H.

It will be apparent to those skilled in the art that other configurations of awning rail(s) may be used to secure the tent-like enclosure 30. Thus, e.g., one may use a single continuous strip of awning rail around said fixturing plate of FIG. 2.

The awning rail 16 (see FIG. 4) can consist essentially of aluminum, plastic, or other suitable material, and said awning rail may be molded as an integral part of said fixturing plate in manufacturing of said fixturing plate.

Furthermore, instead of using said one or more of said awning rails 16 to secure enclosure 30, one may use devices such as closely spaced snap means, rivets, sewing means, fuzzy fabric and hook mating fabric means, etc. The use of the awning rail(s) is preferred because disassembly of said tent-like enclosure 30 from the fixturing plate 10 of FIG. 1 is easily achieved, thus making laundering, repair, etc. of said tent-like enclosure 30 convenient.

The use of the awning rail means is also preferred because a superior seal of the tent-like enclosure 30 of FIG. 1 to the vehicle is achieved. Thus, e.g., referring again to FIG. 4, an additional short flap of fabric 38 may be sewn onto the fabric 32 of the tent-like enclosure; and, during installation of said enclosure on the vehicle, after said fixturing plate 10 is fitted into groove 2 of tailgate window gasket 4, said flap of fabric 38 may be tucked into recessed area 6 along the entire length of the tailgate window gasket 4.

Figure 3:
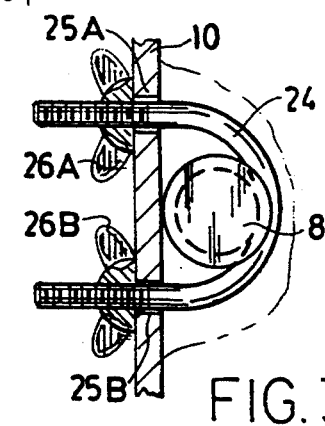
FIG. 3 is a detailed section view of U-bolt means adapted to secure the fixturing plate of FIG. 2 to the vehicle.

Applicant's fixturing plate 10 may be further secured to the vehicle 100 by fastener means 22A and 22B. FIG. 3 is a detailed sectional view illustrating wings nuts 26A and 26B which correspond to fastener means 22A and 22B (not shown in FIG. 3) and how such wing nuts 26A and 26B secure the fixturing plate 10 to the vehicle 100. Referring to FIG. 3, and in the preferred embodiment illustrated therein, U-bolt 24 extends through holes 25A and 25B in fixturing plate 10, and is secured to said fixturing plate 10 by wing nuts 26A and 26B. When the applicant's tent-like enclosure 30 is installed on the vehicle 100, U-bolt 24 is tightly secured around vehicle tailgate latch post 8 (see FIG. 3) by wing nuts 26A and 26B.

Thus, applicant's fixturing plate 10 is rigidly secured to the vehicle 100, with horizontal movement of the fixturing plate 10 prevented by insertion into the tailgate gasket groove 2 (see FIG. 4) of the vehicle 100, and by U-bolt means 26 (see FIG. 3); and vertical movement of said fixturing plate 10 is prevented by U-bolt means 24. As will thus be readily apparent to those skilled in the art, the fixturing plate 10 of applicant's modular system 11 may be readily attached to or removed from the vehicle 100 without the need to modify or add to the vehicle structure.

Applicant's tent-like enclosure 30 is compact and easily stored and can be readily transported when not installed on the vehicle 100.

Figure 15:
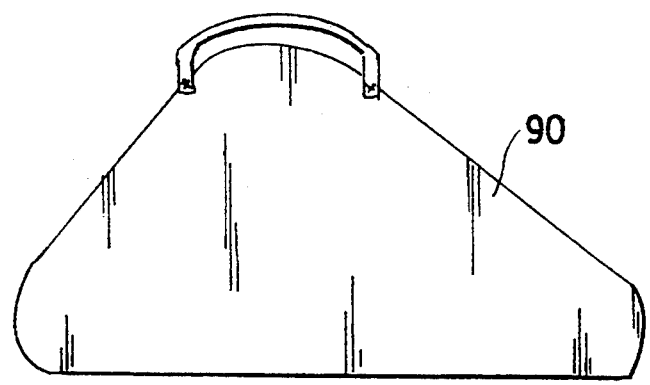
FIG. 15 is a side elevation view of the storage bag of the applicant's invention for the transportation and storage of the tent-like enclosure, windows, and awning of FIG. 1.

Referring again to FIG. 2, and in the preferred embodiment illustrated therein, the fixturing plate 10 is preferably fabricated in two halves 10A and 10B, and joined together by hinge 28. Consequently, when said fixturing plate 10 and the attached tent-like enclosure 30 are not installed on the vehicle 100, the two halves 10A and 10B can be pivoted onto each other by the operation of hinge 28. The collapsed apparatus (not shown) thus assumes a triangular shape, and can be stored and transported in the bag 90 (see FIG. 15).

Instead of, or in addition to hinge 28, one may use other means for attaching halves 10A and 10B. Thus, by way of illustration and not limitation, one may use a joint with a removable pin. Alternatively, or additionally, a plurality of hinges or joints may be provided on different portions of the fixturing plate to achieve even more compact storage of the apparatus.

In one embodiment, not shown, means are provided for locking halves 10A and 10B into a substantially coplanar relationship after they have aligned into such relationship.

Figure 6:
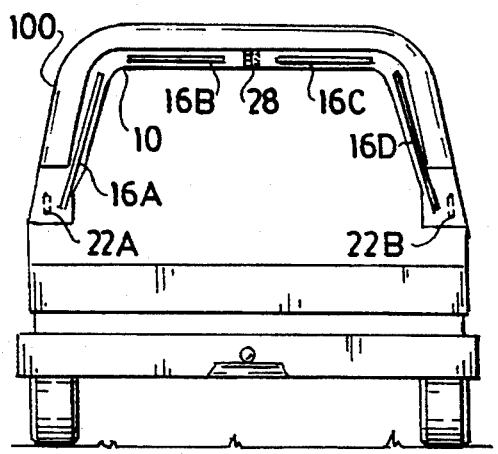
FIG. 6 is a rear elevation view showing the fit of the fixturing plate of FIG. 2 to the rear of the vehicle.
Figure 7:
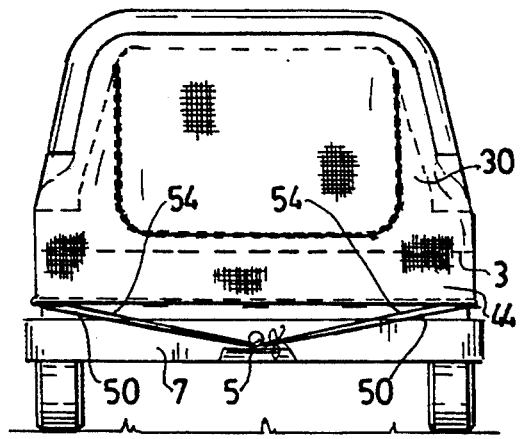
FIG. 7 is a rear elevation view showing the fit of the tent-like enclosure of FIG. 5 to the rear of the vehicle.

FIG. 6 is a rear elevation view showing the mounting of the fixturing plate 10 to the rear of the vehicle 100; in this FIG. 6, the tent-like enclosure 30 has been omitted for the sake of simplicity, it being apparent that, in practice, the applicant's tent-like enclosure 30 of FIG. 7 is installed on the vehicle as a complete assembly joined to the fixturing plate 10 of FIG. 6.

Figure 5:
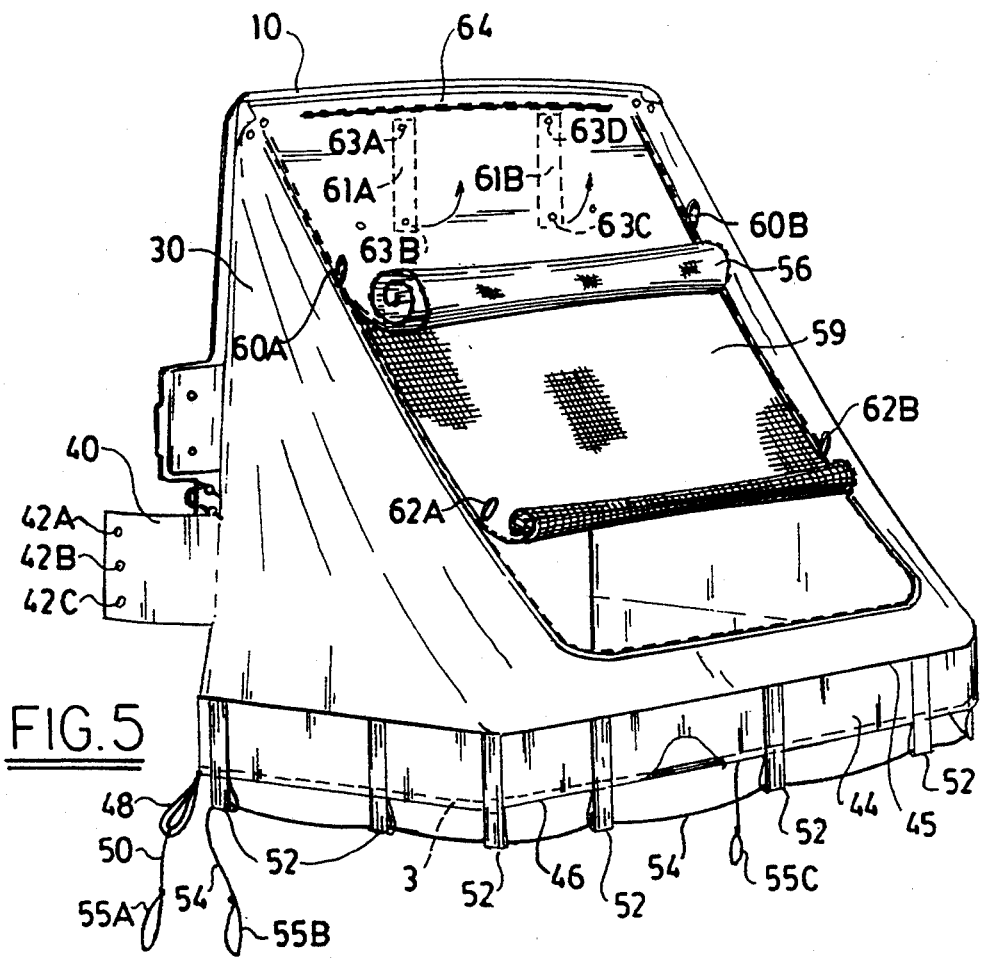
FIG. 5 is a perspective view of a preferred embodiment of the tent-like enclosure of FIG. 1 joined to the fixturing plate of FIG. 2

FIG. 5 is a perspective view of one preferred embodiment of the tent-like enclosure 30 joined to the fixturing plate 10. FIG. 5 also depicts some preferred means of securing the tent-like enclosure 30 around the opened tailgate 3 of the vehicle 100, as well as numerous additional features of the tent-like enclosure 30.

The tent-like enclosure 30 may be constructed from any suitable weather and sunlight resistant fabric customarily used in the construction of camping tents. In one embodiment of applicant's invention, said tent-like enclosure 30 is constructed of acrylic polymer canvas fabric. Alternatively, said tent-like enclosure could be constructed of nylon (a polyamide sold by E. I. Dupont Co.), Gore-Tex (a substantially water-proof fabric material sold by the W. L. Gore Inc.), and the like.

By way of further illustration, the weather-resistant fabric used in tent-like enclosure 30 may be one or more of the weather-resistant fabrics disclosed in U.S. Pat. Nos. 5,035,006, 4,977,719, 4,866,898, 4,843,994, and the like. The disclosure of each of these United States patents is hereby incorporated by reference into this specification.

Referring again to FIG. 5, the tent-like enclosure 30 may be further secured to the inner wall 1 (see FIG. 8) of the vehicle 100 adjacent to the tailgate opening by flaps of fabric 40 (see FIG. 5) on each side of the tent-like enclosure 30; for the sake of simplicity, only one such fabric flap 40 is shown in FIG. 5. To said flaps of fabric 40 are attached conventional fastening means, such as snaps 42A, 42B, and 42C. Alternatively, or additionally, other fastening means (such as a fuzzy fabric to be mated with a hook fabric) can also be used.

Figure 8:
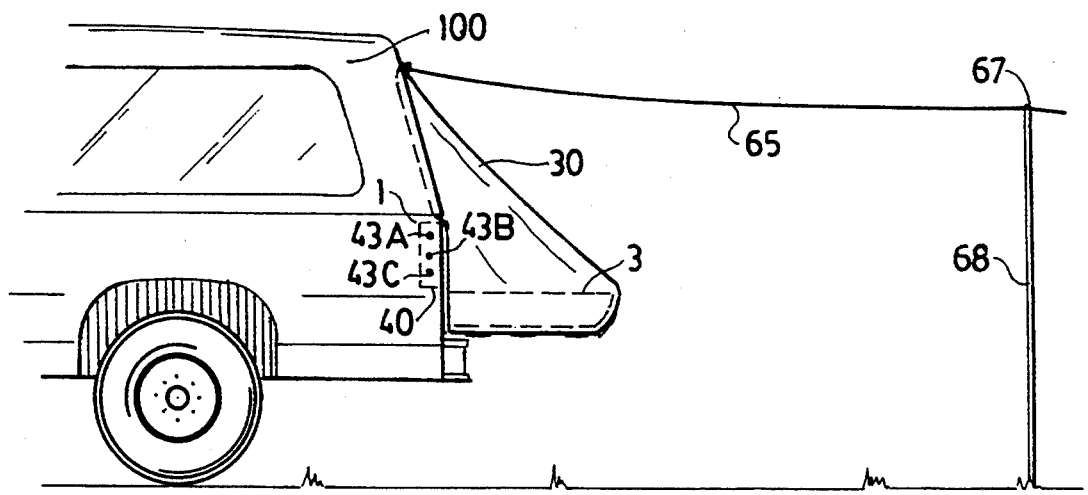
FIG. 8 is a side elevation view showing the fit of the tent-like enclosure of FIG. 5 and awning of FIG. 9 to the rear of the vehicle.

Referring to FIG. 8, in the corresponding position on the inner wall 1 of the vehicle 100, mating fasteners 43A, 43B, and 43C are suitably secured to inner wall 1, thereby enabling said flap of fabric 40 (shown in phantom) to be secured to said inner wall 1 of the vehicle 100.

The applicant's tent-like enclosure 30 may be further secured to the tailgate 3 of the vehicle 100 by additional fastening means, some of which are illustrated in FIG. 5. Referring to FIG. 5, a skirt of material 44 is provided at the base 45 of the tent-like enclosure 30 along the area of contact of said tent-like enclosure 30 which is in contact with the opened tailgate 3 of the vehicle, shown in phantom. At the lower extremity 46 of said skirt of material 44, an elastic cord (not shown) is sewn into a loop of fabric of the skirt of material 44. The elastic cord preferably extends around the lower perimeter of the skirt of material 44.

At several points at the lower extremity 46 of the skirt of material 44 which is closest in proximity to the vehicle, short loops of fabric 48 are suitably attached to the skirt of material 44. A length of cord 50 with a knotted loop 55A is tied to said short loop of fabric 48. A series of wide loops of fabric 52 are also suitably attached to said skirt of material 44 around ills perimeter. Through said wide loops of fabric 52 is strung a length of cord 54 with knotted loops 55B and 55C formed in each end.

Referring to FIG. 7, it will be apparent that when said lengths of cord 50 and 54 of FIG. 5 are secured under tension to trailer ball 5 on vehicle rear bumper 7, said skirt of material 44 is snugly drawn around said opened tailgate 3 (shown in phantom). Alternatively, or additionally, said lengths of cord 50 and 54 could be secured to other points of attachment of vehicle rear bumper 7, or other points of the vehicle undercarriage.

Thus it will be apparent that said tent like enclosure 30 can be fully secured to the vehicle 100 in a manner which allows such enclosure 30 to exclude inclement weather.

Additional features are preferably provided on applicant's tent like enclosure 30 for the convenience of use. Referring to FIG. 5, a fabric doorway 56 and screen 58 form the major area of the central portion 59 of the tent-like enclosure 30. Doorway 56 and screen 58 may be opened by the operation of zippers 60A and 60B, and 62A and 62B, respectively. Fabric doorway 56 and screen 58 may be secured in a rolled up open position by fabric loops 61A and 61B which are fitted with snaps 63A, 63B, 63C, and 63D, or other joining means.

Thus, the doorway 56 and screen 58 may be positioned for easy entry into and exit from the vehicle, for maximum ventilation within the vehicle, and for maximum protection from inclement weather. The zippers 60A and 60B of said doorway 56 are fabricated with a narrow flap of material (not shown) which covers said zippers 60A and 60B and prevents leakage of water through the zippers 60A and 60B.

Figure 9:
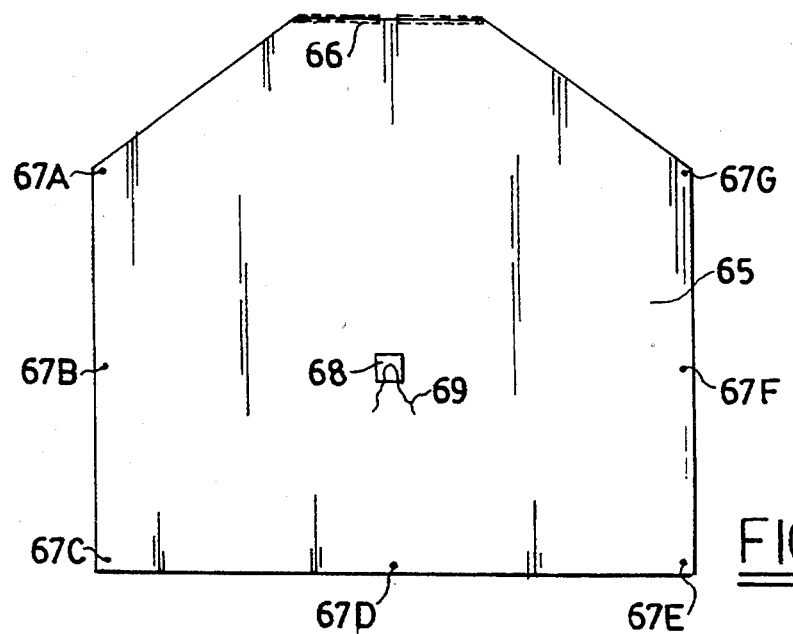
FIG. 9 is a plan view of one embodiment of the awning of applicant's invention.

FIG. 9 is a plan view of one embodiment of the fabric awning 65 used in the structure of FIG. 8. The fabric awning 65 can be constructed of the same variety of weather resistant fabric as previously described for applicant's tent-like enclosure 30, or it may be comprised of different material.

Referring to FIG. 9, fabric awning 65 is preferably equipped with zipper 66, grommets 67A through 67G, reinforcement patch 68 of fabric, and cord 69 suitably fastened to said reinforcement patch 68.

To attach said fabric awning 65 to said tent like enclosure 30, zipper 66 of FIG. 9 is joined to zipper 64 of FIG. 5.

Referring again to FIG. 1, said awning 65 is fixed in a horizontal position behind the vehicle by the use of poles 68, which are fixed in position by the use of cords (not shown) tied to the poles 68 and tied to stakes in the ground (not shown).

Figure 10:
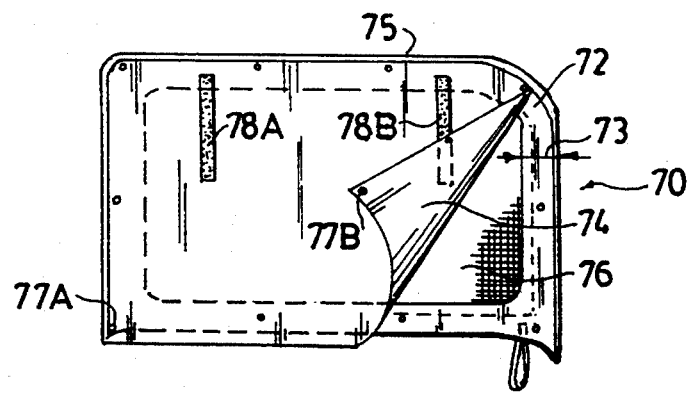
FIG. 10 is a view of the preferred embodiment of the ventilation window assembly of applicant's invention.

FIG. 10 is a perspective view of a preferred embodiment of the ventilation window assembly 70 of applicant's invention. Referring to FIG. 10, applicant's ventilation window 70 is preferably comprised of a fixturing plate 72, fabric covering 74, and screen 76. Fixturing plate 72 can be constructed of the same variety of materials as previously described for applicant's fixturing plate 10. Fabric covering 74 can be constructed of the same variety of weather resistant fabrics as previously described for applicant's tent-like enclosure 30.

Fabric covering 74 and screen 76 are suitably fastened to fixturing plate 72 by the use of conventional fastening means such as snaps, sewing, rivets, or the mating of a fuzzy fabric with a hook fabric. Fabric covering 74 can be rolled up and secured in a rolled up state by the use of strips of fuzzy fabric and hook fabric 78A and 78B to achieve maximum ventilation flow of air through the screen 76 of ventilation window 70.

In one embodiment of applicant's ventilation window 70, fixturing plate 72 was constructed of ⅛ inch thick high density polypropylene; the width 73 of fixturing plate 72 around the perimeter of said fixturing plate was 2 inches; fabric covering 74 was constructed of acrylic polymer canvas fabric; screen 76 was sewn to said fixturing plate 72 around the perimeter of said fixturing plate 72; and said fabric covering 74 was fastened to said fixturing plate 72 by sewing along upper edge 75, and by snaps 77A and 77B in the lowered position of said fabric covering.

Figure 11:
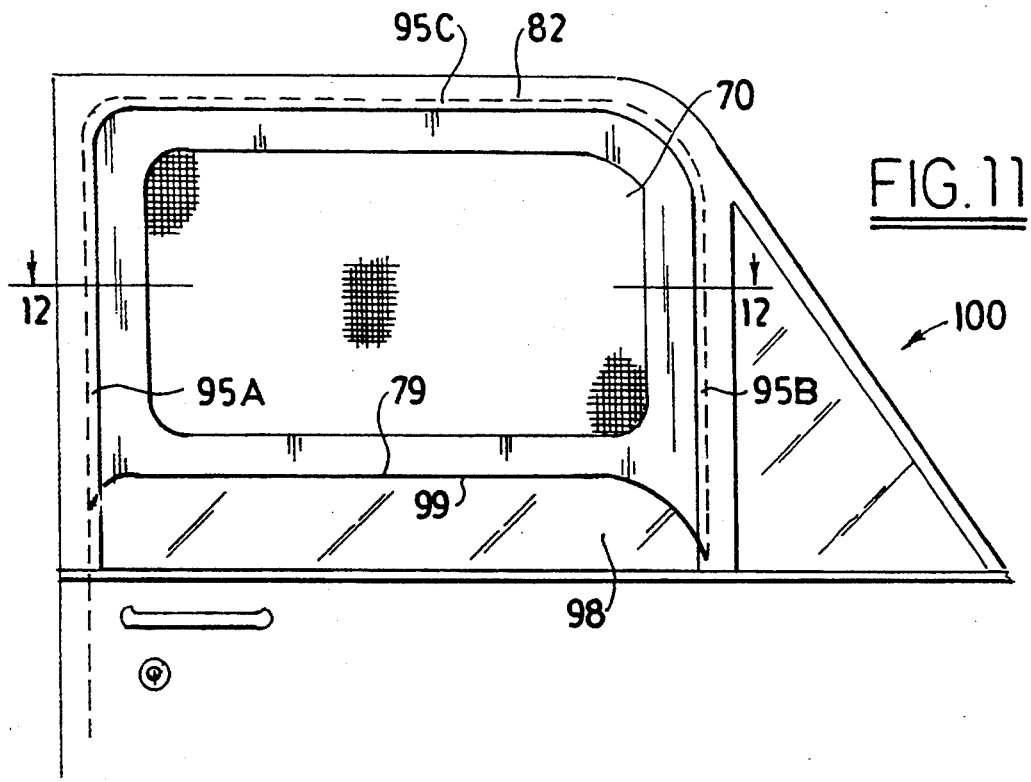
FIG. 11 is an elevation view of the ventilation window of FIG. 10 shown installed in the vehicle door.

FIG. 11 is an elevation view of the ventilation window 70 of FIG. 10 shown installed in the vehicle door, with the fabric covering 74 not shown for the sake of simplicity. The manner of installation of applicant's ventilation window 70 in the window opening of the vehicle door is shown in FIGS. 12 through 14.

Figure 12:
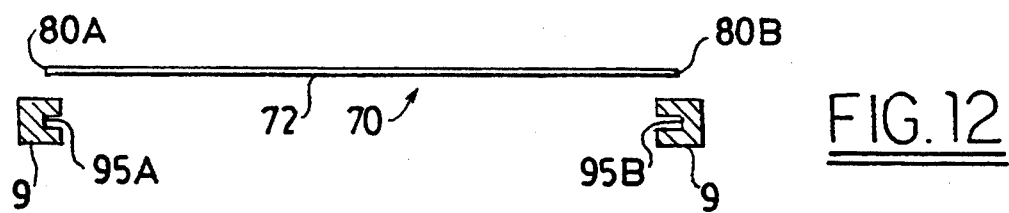
FIGS. 12, 13, and 14 is a section view of the ventilation window assembly of FIG. 10 depicting the sequence of installation of the assembly into the window gasket channel of the door of the vehicle.

Referring to FIG. 12, which is vertical sectional view taken along lines 12—12 of FIG. 11, ventilation window 70 is brought into close proximity to the door window gasket 9 of the vehicle 100.

Figure 13:
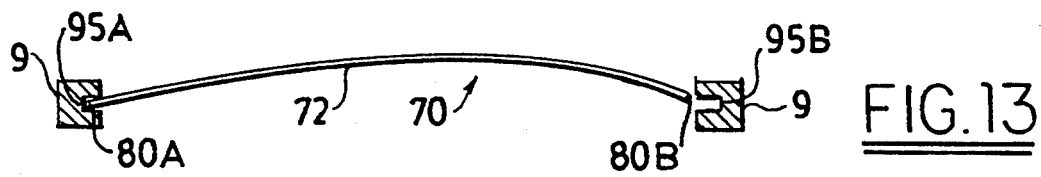
Figure 14:
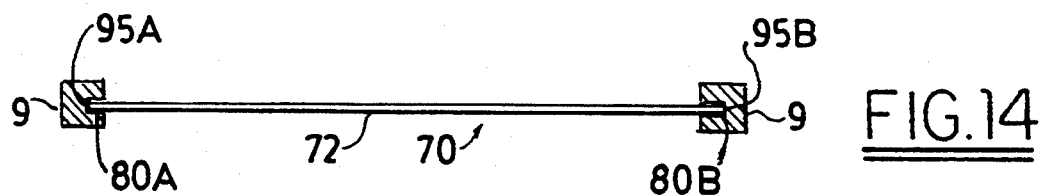

FIGS. 13 and 14 illustrate the mounting of the fixturing plate 72. Referring to FIG. 13, fixturing plate 72 edge 80A is inserted into door window gasket groove 95A and fixturing plate 72 is put under compression resulting in the temporary bending of fixturing plate 72. Fixturing plate 72 edge 80B is then inserted in door window gasket groove 95B, and the compressive force on fixturing plate 72 is then released. Fixturing plate 72 is thus fitted into door window gasket grooves 95A and 95B of FIG. 14 as shown.

Referring again to FIG. 11, ventilation window 70 is then slid vertically upward such that the upper edge 82 (shown in phantom) of fixturing plate 72 is fully inserted in the upper portion of the vehicle door window gasket groove 95C. To complete the installation of the ventilation window 70, the vehicle window 98 is raised until the upper edge 99 of said vehicle window 98 comes in snug contact with the lower edge 79 of the fixturing plate 72 of the ventilation window. The lower edge 79 of said fixturing plate 72 is dimensioned precisely the same as the upper edge 99 of the vehicle window 98, so that when the two edges 79 and 99 come into close contact, a good fit and seal of the ventilation window 70 to the vehicle door is achieved.

Figure 16:
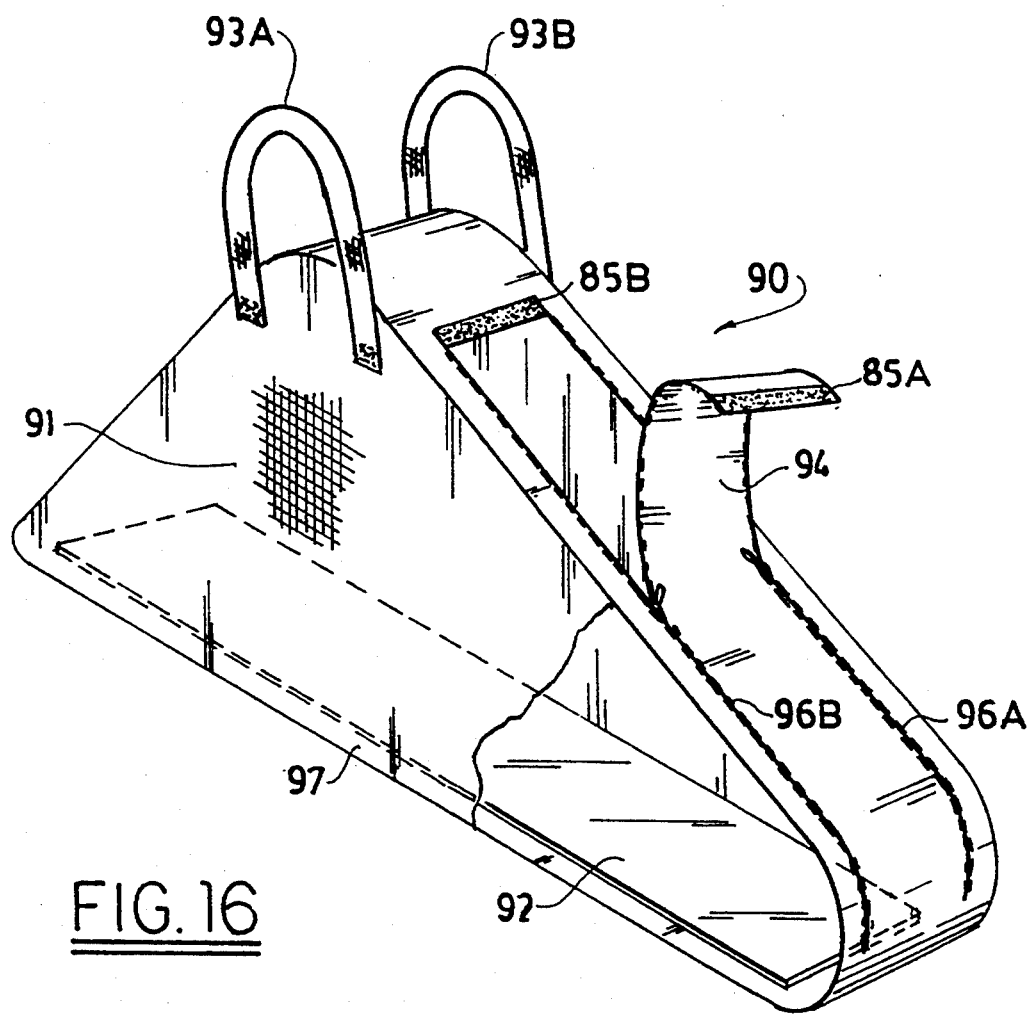
FIG. 16 is a perspective view of the storage bag of FIG. 15 showing the interior of the bag in phantom and via a cutaway section.

FIG. 16 is a perspective view of the bag 90 for the storage and transportation of applicant's tent-like enclosure 30, awning 65, ventilation windows 70, and accessories such as poles 68 and cords showing the interior of the bag in phantom and via a cutaway section. Referring to FIG. 16, said bag 90 is preferably comprised of fabric 91, support plate 92, handles 93A and 93B, and fabric opening flap 94. The various components of applicant's invention are placed in or taken from bag 90 through said fabric opening flap 94. Said fabric opening flap 94 is secured along its uppermost edge by fuzzy fabric strip 85A which attaches to hook fabric strip 85B, and said fabric opening flap 94 is opened and closed by the operation of zippers 96A and 96B. Support plate 92 is suitably fastened to the bottom 97 of said bag 90 to provide rigidity and structural strength to said bag 90.

The fabric 91 of said bag 90 can be constructed of the same variety of weather resistant fabrics as previously described for applicant's tent-like enclosure. Support plate 92 can be constructed of the same variety of materials as previously described for applicant's fixturing plate 10 of FIG. 2 In one embodiment of applicant's bag 90 of FIG. 16, support plate 92 was constructed of ⅛ inch thick high density polypropylene; and the fabric 91 of said bag 90 was acrylic polymer canvas material.

Referring again to FIGS. 1 through 16, the manner of installation of the applicant's modular system for camping in a sport utility vehicle will now be described.

Installation is initiated by lowering the windows in the doors of the vehicle, unlatching the spare tire carrying rack from the tailgate of the vehicle (if said vehicle is so equipped) and swinging it around approximately 150 degrees to its open position, retracting the tailgate window into the tailgate, and lowering the tailgate from its closed vertical position to its open horizontal position. The tent-like enclosure 30, ventilation windows 70, and awning 65 of FIGS. 5, 10, and 9, respectively are removed from the bag 90 of FIG. 16. It should be noted that the procedure for installation is independent of whether the vehicle spare tire is carried inside or outside of the vehicle, as the outside spare tire carrier rack is entirely outside of the tent-like enclosure assembly and thus has no effect on the installation procedure.

Upon removal from bag 90 of FIG. 16, the fixturing plate 10 of FIG. 2 with the collapsed and rolled up tent-like enclosure 30 of FIG. 5 is unfolded from its stored configuration to its installed configuration by operation of the hinge 28 of FIG. 2. Both halves 10A and 10B of the fixturing plate 10 joined by the hinge 28 thus become coplanar and the fixturing plate 10 and collapsed tent-like enclosure 30 assume approximately a trapezoidal shape.

The upper edge 12 of the fixturing plate 10 of FIG. 2, having precisely the same contour as the upper edge of the tailgate window of the vehicle, is inserted into the elastomeric tailgate window gasket groove 2 of the vehicle shown in FIG. 4. Referring to FIG. 3, U-bolts 24 are then secured over tailgate door latch posts 8 via the tightening of wing nuts 26A and 26B. Referring to FIG. 5, with the fixturing plate rigidly secured to the vehicle, flaps 40 are secured to the interior side walls 1 of the vehicle 100 in FIG. 8 via a fuzzy fabric sewn into the flaps 40, and an adhesive backed mating fabric joined to the side walls 1 of the vehicle. Referring again to FIG. 5, the skirt of material 44 of the tent-like enclosure 30 is drawn over the vehicle tailgate 3 shown in phantom. Referring to FIG. 8, loops 55A of cords 50 (only one side shown) and loops 55B and 55C of cord 52 are secured to the trailer ball 5 of the vehicle 100 and placed under tension.

Referring again to FIG. 5, the fabric doorway 56 and screen 58 beneath said window 56, being secured by zippers 60A and 60B, and 62A and 62B respectively, can be opened, closed, and positioned as desired for entry and exit of the vehicle and for the desired degree of ventilation and weather protection.

The installation of the awning 65 is now described. The awning 65 is unfolded and spread out behind the vehicle 100, with the zipper 66 of FIG. 9 along the edge of the awning 65 aligned immediately adjacent to the zipper 64 sewn into the exterior of the tent-like enclosure 30 of FIG. 5. Said zipper halves are joined together, securing the awning 65 to the tent-like enclosure 30 of FIG. 8. The installation is completed by inserting conventional tent poles 68 into grommets 67, and fixing the position of said tent poles 68 with ropes, elastic cords, and stakes.

The installation of applicant's ventilation window was thoroughly described previously in this specification. Installation of a matching ventilation window on the opposite side of the vehicle is accomplished via an identical procedure, as said windows are mirror images of each other.

It should be readily apparent that the applicant's invention described above is easily installed and removed from the vehicle; is easily stored and transported; provides superior protection from adverse weather conditions; provides superior ventilation throughout the entire interior of the vehicle; and provides easy entry and egress from the vehicle as compared to other prior art inventions.

It is to be understood that the aforementioned description is illustrative only and that changes can be made in the components of the apparatus, the materials of construction, the order in which they are secured to the vehicle, as well as other aspects of the invention discussed herein, without departing from the scope of the invention as defined in the following claims.

I claim:

1. An apparatus for attaching an enclosure to the back of a motor vehicle comprised of a back section comprising a rear access opening with a quadrilateral shape defined by a first side, a second side, a third side, and a fourth side, wherein said first side, said second side, said third side, and said fourth side also define the perimeter of said opening, wherein said apparatus is comprised of a plate in contact with at least a portion of said perimeter of said rear access opening of said motor vehicle, first means for attaching a first portion of said plate to said perimeter of said rear access opening of said motor vehicle, second means for attaching a second portion of said plate to said perimeter of said rear access opening of said motor vehicle, a substantially weather-proof cover, means for attaching said cover to said plate, and means for attaching said cover to said motor vehicle, wherein when said weatherproof cover is attached to both said plate and to said motor vehicle, it encloses the space between said back section of said vehicle and said cover and forms a substantially water-proof enclosure covering said space, and, when said weatherproof cover is attached to both said plate and to said motor vehicle, said plate is contiguous with at least a portion of each of three adjacent sides selected from said first side, said second side, said third side, and said fourth side of said rear access opening.

2. An apparatus for attaching an enclosure to the back of a motor vehicle comprised of a back section comprising a tailgate and a back window wherein said apparatus is comprised of a substantially U-shaped plate, first means for attaching a first portion of said substantially U-shaped plate to said motor vehicle, second means for attaching a second portion of said substantially U-shaped plate to said motor vehicle, a substantially weather-proof cover, means for attaching said cover to said substantially U-shaped plate and means for attaching said cover to said motor vehicle, wherein when said weatherproof cover is attached to both said substantially U-shaped plate and to said motor vehicle, it encloses the space between said back section of said vehicle and said cover and forms a substantially water-proof enclosure covering said space, wherein said substantially U-shaped plate is comprised of a left arm and a right arm hingably attached to each other.

3. An apparatus for attaching an enclosure to the back of a motor vehicle comprised of a back section comprising a tailgate and a back window, wherein said apparatus is comprised of a substantially U-shaped plate means for attaching a first portion of said substantially U-shaped plate to said motor vehicle, second means for attaching a second portion of said substantially U-shaped plate to said motor vehicle, a substantially weather-proof cover, means for attaching said cover to said substantially U-shaped plate, and means for attaching said cover to said motor vehicle, wherein when said weatherproof cover is attached to both said substantially U-shaped plate and to said motor vehicle, it encloses the space between said back section of said vehicle and said cover and forms a substantially waterproof enclosure covering said space, wherein at least one awning rail is attached to said substantially U-shaped plate.

4. The apparatus as recited in claim 3, wherein a waterproof gasket material is attached to said rear access opening of said motor vehicle.

5. The apparatus as recited in claim 3, wherein said first means for attaching a first portion of said plate to said motor vehicle is comprised of a U-bolt and two nuts.

6. An apparatus for attaching an enclosure to the back of a motor vehicle comprised of a back section comprising a rear access opening with a quadrilateral shape defined by a first side, a second side, a third side, and a fourth side, wherein said first side, said second side, said third side, and said fourth side also define the perimeter of said opening, wherein said apparatus is comprised of a plate in contact with at least a portion of said perimeter of said rear access opening of said motor vehicle, first means for attaching a first portion of said plate to said perimeter of said rear access opening of said motor vehicle, second means for attaching a second portion of said plate to said perimeter of said rear access opening of said motor vehicle, a substantially weather-proof cover, means for attaching said cover to said plate, and means for attaching said cover to said motor vehicle, wherein when said weatherproof cover is attached to both said plate and to said motor vehicle, it encloses the space between said back section of said vehicle and said cover and forms a substantially water-proof enclosure covering said space, and wherein at least one awning rail is attached to said plate.

7. An apparatus for attaching an enclosure to the back of a motor vehicle comprised of a back section comprising a rear access opening with a quadrilateral shape defined by a first side, a second side, a third side, and a fourth side, wherein said first side, said second side, said third side, and said fourth side also define the perimeter of said opening, wherein said apparatus is comprised of a plate in contact with at least a portion of said perimeter of said rear access opening of said motor vehicle, first means for attaching a first portion of said plate to said perimeter of said rear access opening of said motor vehicle, second means for attaching a second portion of said plate to said perimeter of said rear access opening of said motor vehicle, a substantially weather-proof cover, means for attaching said cover to said plate, and means for attaching said cover to said motor vehicle, wherein when said weatherproof cover is attached to both said plate and to said motor vehicle, it encloses the space between said back section of said vehicle and said cover and forms a substantially water-proof enclosure covering said space, and wherein said plate is comprised of a left arm and a right arm hingably attached to each other.

* * * * *